US012147814B2

United States Patent
Ootjers

(10) Patent No.: US 12,147,814 B2
(45) Date of Patent: Nov. 19, 2024

(54) DYNAMIC THREAD COUNT OPTIMIZATIONS

(71) Applicant: MICROSOFT TECHNOLOGY LICENSING, LLC, Redmond, WA (US)

(72) Inventor: Thomas James Ootjers, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 18/137,063

(22) Filed: Apr. 20, 2023

(65) Prior Publication Data

US 2024/0160451 A1 May 16, 2024

Related U.S. Application Data

(60) Provisional application No. 63/424,662, filed on Nov. 11, 2022.

(51) Int. Cl.
*G06F 9/30* (2018.01)
*G06F 9/38* (2018.01)
(Continued)

(52) U.S. Cl.
CPC .......... *G06F 9/3867* (2013.01); *G06F 9/4881* (2013.01); *G06F 9/505* (2013.01);
(Continued)

(58) Field of Classification Search
CPC ...... G06F 9/3867; G06F 9/4881; G06F 9/505; G06F 2209/5011; G06F 2209/5018
See application file for complete search history.

(56) References Cited

U.S. PATENT DOCUMENTS

| 8,381,216 | B2 * | 2/2013 | Gowda | G06F 9/5027 |
| | | | | 712/30 |
| 9,921,870 | B2 * | 3/2018 | Gleyzer | G06F 9/5027 |

(Continued)

FOREIGN PATENT DOCUMENTS

| CN | 111444012 A | 7/2020 |
| CN | 113467933 A | 10/2021 |

(Continued)

OTHER PUBLICATIONS

Li, et al., "EXTRA: An Experience-driven Control Framework for Distributed Stream Data Processing with a Variable Number of Threads", In Proceedings of IEEE/ACM 29th International Symposium on Quality of Service, Jun. 25, 2021, 11 Pages.

(Continued)

*Primary Examiner* — Corey S Faherty
(74) *Attorney, Agent, or Firm* — Workman Nydegger

(57) ABSTRACT

Dynamic thread count optimizations include determining: (i) a detected quantity of unassigned IO requests; (ii) a quantity of IO requests currently in process; (iii) a thread pipeline value required to fill a thread's pipeline capacity and based on ratio of (a) an IO duration time from when an IO request is issued until a corresponding IO completion is received and (b) an IO processing time from when an IO request is assigned to a thread until it is issued; and (v) an ideal thread quantity based on a ratio of (a) the quantity of IO requests to be processed and (b) the thread pipeline value. Said optimizations also include dynamically activating new threads whenever a quantity of active threads is determined to be less than the ideal thread quantity.

20 Claims, 4 Drawing Sheets

(51) Int. Cl.
*G06F 9/48* (2006.01)
*G06F 9/50* (2006.01)

(52) U.S. Cl.
CPC .......... *G06F 2209/5011* (2013.01); *G06F 2209/5018* (2013.01)

(56) References Cited

U.S. PATENT DOCUMENTS

| 10,552,213 | B2* | 2/2020 | Lloyd .......... G06F 9/5038 |
| 2003/0115168 | A1 | 6/2003 | Robison |
| 2008/0126539 | A1 | 5/2008 | Banerjee et al. |
| 2019/0163524 | A1 | 5/2019 | Chang |
| 2021/0157635 | A1 | 5/2021 | Rinaldi et al. |

FOREIGN PATENT DOCUMENTS

| CN | 114237505 A | 3/2022 |
| CN | 115269196 A | 11/2022 |

OTHER PUBLICATIONS

U.S. Appl. No. 63/424,662, filed Nov. 11, 2022.
International Search Report and Written Opinion received for PCT Application No. PCT/US2023/035360, (MS# 412502-PCT01) Jan. 24, 2024, 14 pages.
Xu, et al., "Performance Study and Dynamic Optimization Design for Thread Pool Systems", International Conference on Computer Communication and Control Technologies: CCCT & International Conference on Information Systems Analysis and Synthesis, Aug. 14, 2004, 6 pages.

* cited by examiner

DYNAMIC THREAD COUNT OPTIMIZATIONS

CROSS-REFERENCE TO RELATED APPLICATIONS

This application claims the benefit of and priority to U.S. Provisional Patent Application Ser. No. 63/424,662, filed on Nov. 11, 2022, and entitled "DYNAMIC THREAD COUNT OPTIMIZATIONS," which application is expressly incorporated herein by reference in its entirety.

BACKGROUND

In conventional computing, a computing system will process data by performing various input/output (IO) operations on the data. Some of these operations are performed by the execution of subprocesses referred to as threads. A thread, for example, can be scheduled to perform discrete processing tasks for the different IO requests that are associated with a given computing process. Threads effectively enable a system processor to perform multiple tasks at the same time, thereby making the tasks faster, by utilizing different threads to process the data.

When a thread is created, different CPU registers, counters, and memory are assigned to the thread for tracking and completing the tasks assigned to that thread. The time costs associated with the creation of a thread can introduce undesired latency into the completion of the corresponding computing process. To help mitigate such latency, a thread can be proactively created and maintained in an idle state within a thread pool until an IO request is assigned to that thread. When an IO request is assigned to a thread in an idle state, that thread will wake up or otherwise be placed into an active state to perform the task(s) associated with the assigned IO request.

Because it is faster to wake up a thread than to create a thread, it is possible to reduce system latencies by creating threads prior to their required use. However, if too many threads are created for the thread pool, some of which may not ever be used, the system will unnecessarily consume and waste resources that may actually be more costly than the time that is required to create the new threads on demand.

For at least these reasons, there is an ongoing need and desire for new and improved systems and techniques for managing thread creation and utilization.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

Systems and methods are provided for managing the creation and utilization of threads and, in some instances, for providing dynamic thread count optimizations in which the determined quantities of threads to be created or activated (e.g., changed from an idle state to an active state) are based on detected changes in processing latencies during runtime for helping maintain a full IO request pipeline for each active thread.

In some embodiments, for example, disclosed systems determine a total quantity of IO requests to be processed based on a combination of (i) a detected total quantity of IO requests received but not yet assigned to a set of threads in a thread pool and (ii) a determined quantity of IO requests currently in process, having been previously assigned to the set of threads, but not yet completed. The IO requests can be any type of request, such as a read request or a write request.

The systems also determine a thread pipeline value associated with a quantity of IO requests required to fill a predetermined average thread pipeline capacity, based on computing a ratio of (i) an IO duration time, which is based on an average time from when an IO request is issued to a storage device until a completion notice of the IO request is received from the storage device and (ii) an IO processing time, which is based on an average time from when an IO is assigned to a thread until it is issued to a storage device;

The systems also determine an ideal thread quantity of active threads for the set of threads in the thread pool by computing a ratio of (i) the total quantity of IO requests to be processed and (ii) the thread pipeline value. Then, the system dynamically activates a new set of one or more threads in the thread pool whenever a total quantity of threads in the thread pool is determined to be less than the ideal thread quantity.

In some instances, the systems detect a change in processing latency comprising an increase in the IO duration time. In response to this detected change in processing latency, the systems dynamically determine to adjust the ideal thread quantity and activate one or more new threads in the thread pool based on the determined new ideal thread quantity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
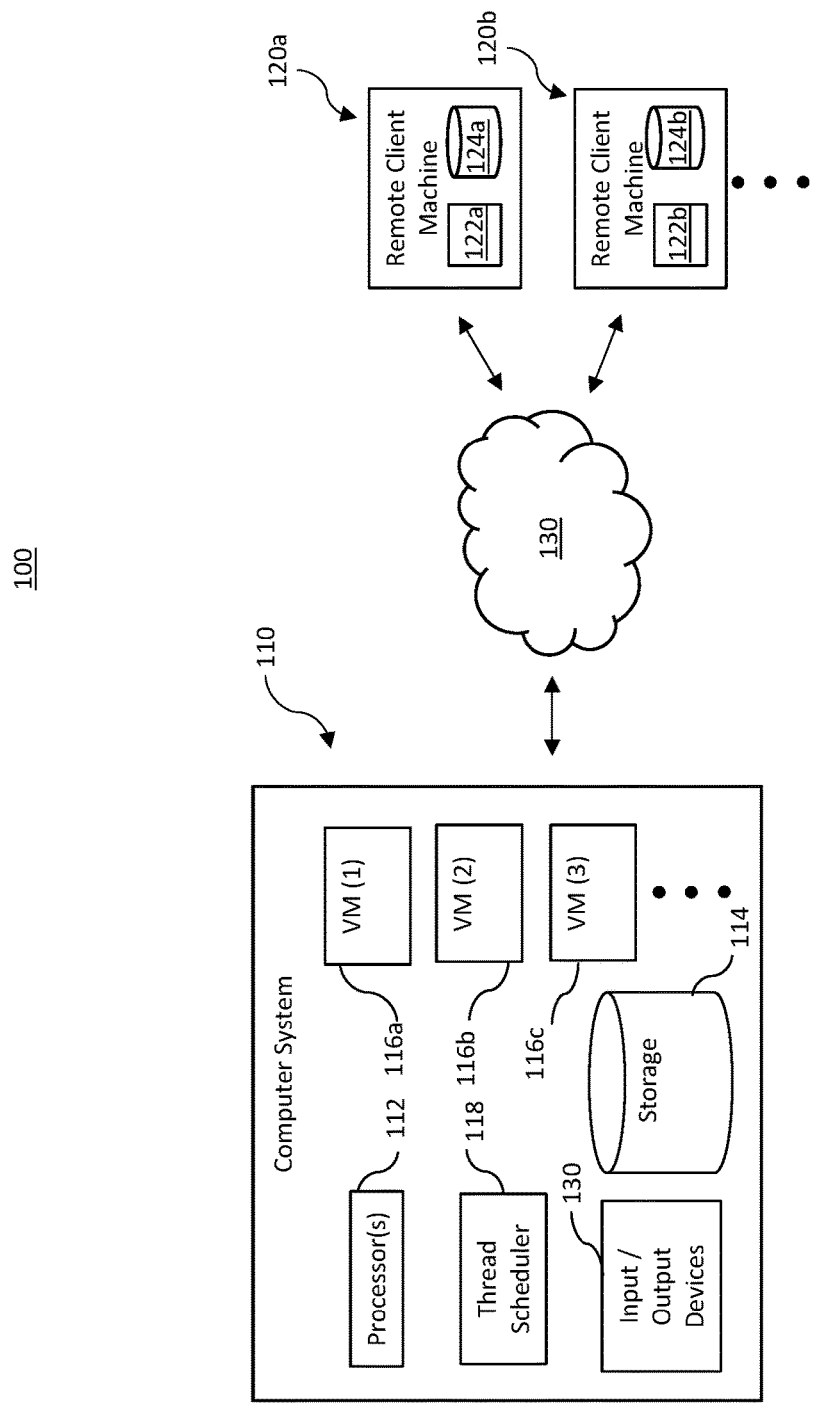
FIG. 1 illustrates an example computing environment that incorporates systems that comprise and/or that may be used to implement aspects of the disclosure.

Systems and methods are provided for facilitating controlled and dynamic management of active threads in a thread pool and for managing the assignment of IO requests to the active threads.

As noted in the Background section above, various costs can be incurred by creating too few or too many threads for a computer system. Too few threads can create latencies in processing and too many threads can waste resources and time creating the threads, as well as switching the states of the threads.

Some conventional systems manage threads by creating a large thread pool, with the threads maintained in an idle state until they are needed, at which point the thread transitions to an active processing state. This configuration, which is currently used for existing File Server stacks, can help reduce runtime latency associated with creating threads on demand. But this configuration is still associated with an increase in overhead required to create and wake up each thread needed for each new IO request.

To help address this problem, some systems predesignate a fixed number of active threads for handling IO requests. However, in these modified configurations, there still exists the possibility that more threads will be created than will be needed. Alternatively, these modified configurations can lead to a queue build-up when there are more IO requests received than there are fixed threads available to handle them.

It is possible to adjust the fixed quantity of active threads created by some constant value, such as based on the queue size of the IO requests, such that the system can better approximate the actual number of active threads that will be needed, and to avoid some of the wake-up costs. But, while this adjustment is better than none, such configurations are still unable to dynamically adjust to processing latency fluctuations associated with different environments and thread processing speeds. In other words, none of the conventional systems adequately account for variations in the costs (e.g., resource costs) of issuing IO requests to the different devices to complete the IO requests and how these changes in costs affect the overall thread pipeline and ideal thread count.

The disclosed embodiments for managing thread activation and utilization provide many technical benefits over the foregoing conventional computing systems and can be used to address some of the aforementioned problems. For instance, the disclosed embodiments facilitate thread count optimizations that reduce overall latencies and costs associated with creating and utilizing threads and an ideal thread count that is based on dynamic variables, such that the quantity of active threads created to satisfy the ideal thread count will adjust responsively to the dynamic variables being considered when determining the ideal thread count.

The technical benefits include, for example, helping to promote activating threads at a pace that enables the threads to maintain a full IO request pipeline without activating unnecessary threads, thereby reducing any unnecessary and wasted costs associated with creating or spinning up new threads and/or by waking up idle threads.

The foregoing benefits and technical advantages will also become more apparent throughout the rest of this disclosure.

Attention will now be directed to FIG. 1. In this illustration, a computing environment 100 includes a computer system 110, such as a server, which is connected to one or more remote systems, such as remote client machine 120*a* and 120*b*. These systems are remotely connected or connectable through various wired and wireless connections of a network 130. Each of these systems may also be configured as a stand-alone system and/or as a distributed system, with the constituent components of each system being stored in either a single location and/or distributed in different locations.

The constituent components of the systems include a processing system comprising respective processor(s) (112, 122*a*, 122*b*) and storage (114, 124*a*, 124*b*). The storage (114, 124*a*, 124*b*) stores code in the form of computer-executable instructions that are executed by the processor(s) (112, 122*a*, 122*b*) to implement the methods and other functionality disclosed herein. In some instances, the referenced processors are hardware processors. In other instances, one or more of the processors can be software processors.

Each of the systems also includes constituent input/output device(s) for receiving user input and for rendering output associated with data being processed by the systems. The input and output generated by and rendered by the systems corresponds with IO requests assigned to and processed by threads executing on the systems, such as IO requests issued by the threads to the different storage devices used by the systems.

In the current configuration, the computer system 110 is a host server system that hosts one or more virtual machines (116*a*, 116*b*, 116*c*) that issue requests to a hypervisor storage stack associated with storage 114. In this configuration, the thread scheduler 118 includes a Hypervisor Storage stack manager for receiving and assigning the IO requests received from the different virtual machines to different threads that correspondingly issue the IO requests to the hypervisor storage stack.

In other instances, the thread scheduler includes a file server storage manager that receives and assigns IO requests of a remote machine to different processing threads that issue the IO requests to a file server storage (e.g., storage 114).

In some instances, the thread scheduler 118 or another OS component is used to not only assign the different IO requests to the different threads, but to also activate the threads to which the IO requests are assigned. This may include creating new threads for a thread pool and/or waking up idle threads that have already been created and are maintained within the thread pool. The thread scheduler 118 or another OS component can also be used to track the different states (e.g., idle, or active) of the threads in the thread pool and the IO requests that have been assigned to the different threads.

The thread scheduler 118 or another OS component can also track (i) the quantity of IO requests to be processed, including a quantity of IO requests received but not yet assigned to a set of threads in a thread pool, as well as a quantity of IO requests currently in process (i.e., having been previously assigned to the set of threads, but not yet completed); (ii) an IO duration time comprising an average time from when an IO request is issued to a storage device until a notification of the IO completion is received from the storage device; and (iii) an IO processing time comprising an average time from when an IO is assigned to a thread until it is issued to a storage device.

With regard to the referenced "set" of threads, it will be noted that unless otherwise specified, the terms "set" and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

The thread scheduler 118 or another OS component can also compute or otherwise determine (i) a thread pipeline value associated with a quantity of IO requests required to fill a predetermined average thread pipeline capacity (e.g., a quantity of IO requests a thread can process over a predetermined processing time) by computing a ratio of the IO duration time and the IO processing time, as well as (ii) the ideal thread quantity of active threads for the set of threads in the thread pool based on computing a ratio of the quantity of IO requests to be processed and the thread pipeline value.

Figure 2:
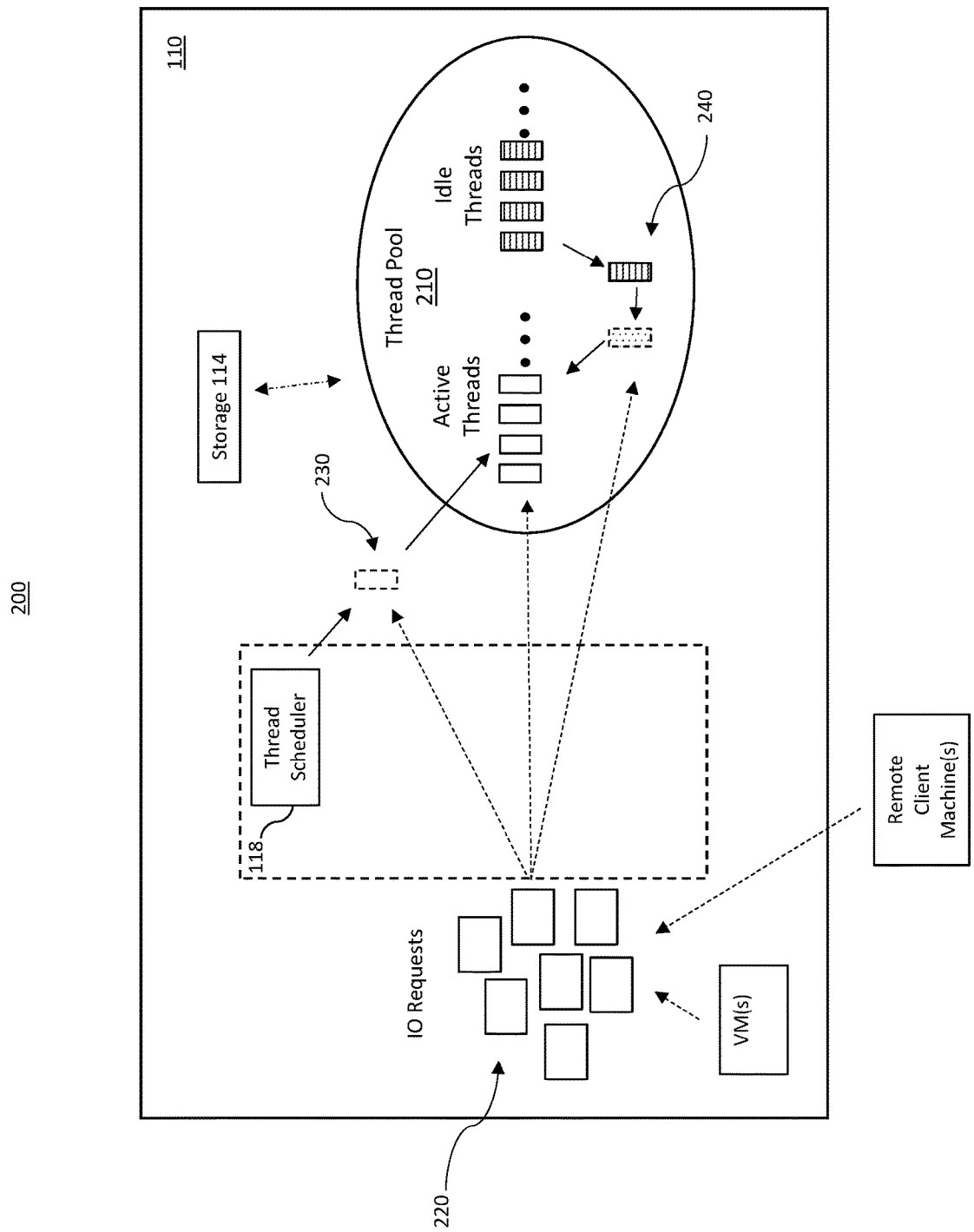
FIG. 2 illustrates an example visualization of IO requests being assigned to threads and the activation of threads for the assignment of the IO requests.

Attention is now directed to FIG. 2. This visualization 200 illustrates a thread scheduler 118 being used to manage thread activation and utilization, as well as for facilitating dynamic thread count optimizations.

As shown, various IO requests 220 are received and assigned to threads in a thread pool 210. The thread pool may include one or more active threads (e.g., threads in an active state). While in the active state, a thread is enabled to utilize assigned CPU registers and state storage to process the IO requests it is assigned, such as by issuing the IO requests to storage 114 (e.g., a hypervisor storage stack, File Server storage) and by tracking state information associated with the IO request being processed.

The active threads are also able to detect and notify the thread scheduler 118 when the IO request is satisfied (i.e., completed), such that an IO duration time can be computed (e.g., the time from when an IO request is issued to the storage 114 until the IO completion notification is received from the storage). Then, the thread scheduler 118 or another OS component can compute an average IO duration time associated with that thread and/or all active threads. The thread scheduler 118 or another OS component can also compute an average IO processing time to assign the IO request(s) to a thread until it is issued to the storage 114, based on the average time it takes for a particular thread and/or all active threads.

The thread pool 210 may also include one or more idle threads (e.g., idle thread 240), wherein each idle thread was previously created but remains in an idle state, unable to receive assigned IO requests or to issue the IO requests to storage until its state is changed to an active state.

The thread scheduler 118 or another OS component can track the status of the different threads, as well as their pipeline capacities.

Ideally, as previously suggested, a quantity of threads that are active will be a quantity in which each active thread has its IO pipeline capacity filled and in which its IO pipeline capacity will remain filled during subsequent processing by the system, as completed IO requests are replaced by newly assigned IO requests.

When a newly received IO request is being assigned, it will first be assigned to an existing thread in an active state (if any). In some instances, and to accommodate different needs and preferences, the new IO request can be assigned to a thread that is determined to have the largest available capacity (e.g., the fewest currently assigned IO requests). This may, for instance, reduce the latency associated with the IO being processed/completed.

In some alternatives, a new IO request is assigned to a thread that has a smallest available capacity (e.g., the most currently assigned IO requests). This may be desirable, for instance, when consolidating certain processing tasks to particular threads and/or to expedite the rate in which extra capacity is freed up (e.g., facilitating a rate in which underutilized active threads have their states changed to an idle state).

When there is no active thread in the thread pool with available capacity to take on a new IO request assignment, the thread scheduler 118 can activate a new thread (e.g., by creating new thread 230 or, alternatively, changing an idle thread 240 to an active state thread). In yet other embodiments, the system simply enqueues the IO request until capacity is made available in an existing active thread to which it can be assigned.

In some alternative implementations, an IO request will only be assigned to a thread when the thread is ready to issue the IO, after dispatching/completing a previously assigned IO request.

Figure 3:
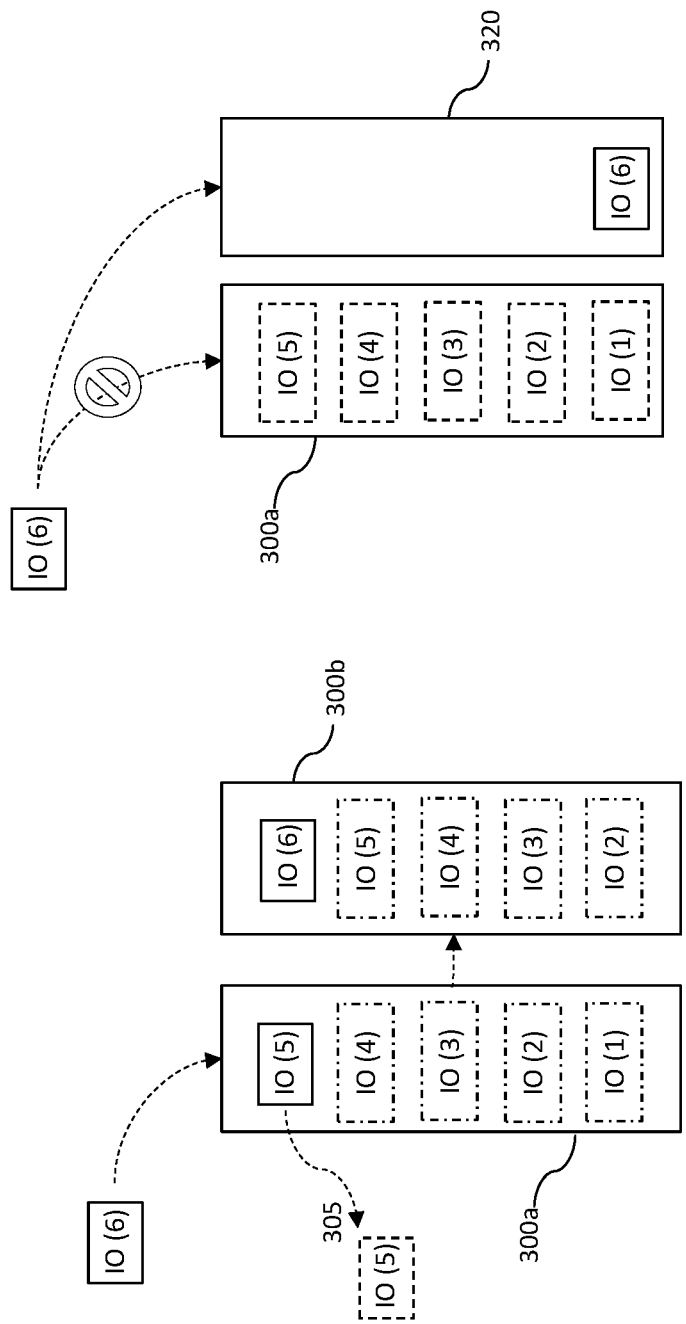
FIGS. 3A-3B illustrate example visualizations of IO requests being assigned to and processed by threads.

FIGS. 3A-3B illustrate some additional visualizations associated with the assignments of IO requests to threads for processing.

In FIG. 3A, a new IO request (e.g., IO(6)) is made available for assignment to an active thread, such as thread 300a. In this visualization, the thread 300a has its IO processing pipeline capacity filled. The thread 300 has issued four of the previously assigned IO requests (e.g., IO(1) thru IO(4)) to storage (as indicated by their dashed lines) and is currently in the process of issuing IO(5) (as indicated by arrow 305). However, until the issued IO requests are completed, the thread 300a will retain the issued IO requests in its pipeline.

The thread 300a will be notified by the storage once the issued IO requests are completed. Then, once any of the issued IO requests complete (e.g., upon detecting a notification from storage that the relevant IO request is complete), the thread 300a will dispose of that issued IO request from its pipeline. It will also notify the thread scheduler or component that created or assigned the IO request to the thread.

Once IO(1) has completed, for example, it can be removed from the thread pipeline. If IO(1) has completed prior to the need for IO(6) to be assigned, then IO(6) can be assigned to the same thread. FIG. 3A shows thread 300a as 300b once IO(1) has been removed from the thread pipeline and IO(6) has been successfully added to the thread pipeline.

Alternatively, if IO(1) has not completed prior to IO(6) being assigned, then IO(6) can be assigned to a different thread (320), such as shown in FIG. 3B. This different thread 320 may be a recently created thread, or a previously created thread that was maintained in an idle state within the thread pool and that has had its state changed to an active state to receive the IO(6) assignment. The different thread 320 can be activated to accommodate the need to assign IO(6) to a thread rather than waiting for new capacity in thread 300a to become available, such as whenever the IO(1) request completes and is removed from the thread pipeline.

To optimize the timing for activating threads, as well as to optimize an ideal quantity of active threads, the disclosed embodiments provide for the dynamic activation of threads based on computation that includes a ratio of (i) a cost of issuing IO requests to storage (e.g., CPU cycles) and (ii) the IO duration time it takes from when an IO request is issued until it is completed. This way, the system can help maintain a limited quantity of threads that have their IO request pipeline capacities filled.

Figure 4:
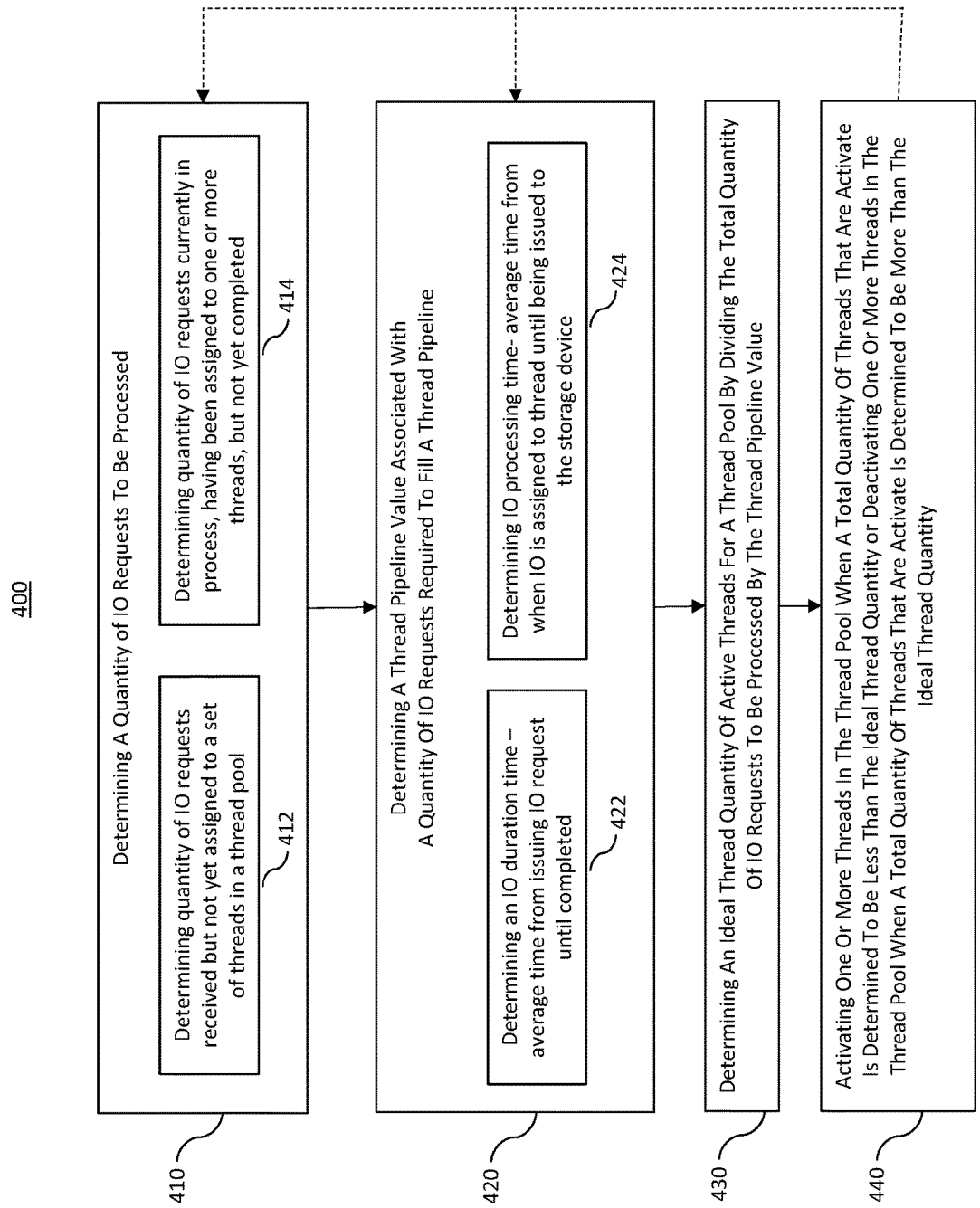
FIG. 4 illustrates an example flow diagram of acts associated with the disclosed methods for managing the creation and utilization of threads, and which includes dynamic thread count optimizations.

When latencies are introduced as a result of an increase in the time it takes for an issued IO request to be processed, the system will dynamically activate new threads. This will be more apparent from the flow diagram 400 illustrations and descriptions provided in reference to FIG. 4.

The flow diagram 400, for example, illustrates acts associated with methods for facilitating dynamic thread count optimizations. The first illustrated act includes determining a quantity of IO requests to be processed (act 410). This act may include additional acts as well, such as the act of determining (e.g., detecting) a quantity of IO requests received but not yet assigned to a set of threads in a thread pool (act 412), as well as determining (e.g., detecting) a quantity of IO requests currently in process, having been assigned to the set of threads, but not yet completed (act 414). The quantity of IO requests to be processed comprises, in some instances, the combination of (i) the quantity of IO requests received but not yet assigned and (ii) quantity of IO requests currently in process.

The system also determines a thread pipeline value associated with a quantity of IO requests required to fill a predetermined average thread pipeline capacity (act 420). This act may include computing a ratio of (i) an IO duration time that is based on an average time from when an IO request is issued to a storage device until the IO completion is received from the storage device (act 422), and (ii) an IO processing time based on an average time from when an IO is assigned to a thread until it is issued to a storage device (act 424).

In some instances, the IO duration time is determined based on measuring average times in which it took a predetermined quantity of previously issued IO requests to be completed. In other instances, the IO duration time is determined based on an estimated timing for completing a predetermined quantity of issued IO requests, based on anticipated processing associated with detected types of IO requests being received and historical trends associated with processing similar IO requests. This determination can be even granularized, for example, by basing the IO duration time on IO request type (e.g., read or write requests). In yet other embodiments, the IO duration time is a user-specified time based on user input specifying the IO duration time. The IO duration time can also be based on other IO request attributes such as a magnitude of IO requests issued to storage and/or bytes outstanding to storage for the IO requests, whether the IO request is a related and sequential IO request or a standalone/random IO request, etc.

The thread pipeline value is computed, for example, by dividing the IO duration time by the IO processing time. In some embodiments, weighting is also applied to any of the foregoing values in computing the ratio of the thread pipeline value to accommodate different needs and preferences, such as to generate a thread pipeline value just above or just under an actual need, such as weighting the IO duration time more heavily to increase the quantity of threads just above an actual need and weighting the IO processing time more heavily to decrease the count of active threads just below an actual need, thereby enabling a user to balance trade-offs between latency and processing costs corresponding to creating slightly more or fewer threads than needed.

Next, the systems also determine an ideal thread quantity of active threads for the set of threads in the thread pool by computing a ratio of (i) the quantity of IO requests to be processed and (ii) the thread pipeline value (act 430). As suggested above, this ratio can be generated by dividing the quantity of IO requests to be processed by the thread pipeline value. If desired, this computation can also include applying weighting to any of the foregoing values to create slightly more or fewer threads than needed (e.g., increasing the IO requests to be processed to create slightly more threads than needed or increasing the thread pipeline value to create slightly fewer threads than needed).

Once the ideal thread quantity is determined, the systems dynamically activate one or more threads in the thread pool whenever a quantity of active threads in the thread pool is determined to be less than the ideal thread quantity. This act may include, for example, changing the status of an inactive thread in the thread pool to an active status and/or by creating an entirely new thread which does not already exist within the thread pool in an inactive state.

Act 440 may also, alternatively, comprise deactivating one or more threads in the thread pool whenever a quantity of active threads in the thread pool is determined to be more than the ideal thread quantity (act 440). This act may include, for example, changing the status of an active thread in the thread pool to an inactive status and/or by deleting a thread from the thread pool in response to determining that the particular thread being deactivated does not have any currently assigned and uncompleted IO requests.

With regard to the foregoing, it is noted that the acts may be performed iteratively, such that the ideal thread quantity of active threads may be a revised value (i.e., a revised ideal thread quantity of active threads) that is created by accounting for changes in the underlying values used to calculate the ideal thread quantity of active threads.

For instance, by way of example, the system may (after determining the initial ideal thread quantity of active threads), detect a change in processing latency comprising an increase in IO processing time, determine to dynamically adjust the ideal thread quantity based on the detected change in processing latency, and finally determine a revised ideal thread quantity and activating a new thread in the thread pool based on the determined revised ideal thread quantity.

In a similar example, the system may also detect a change in processing latency comprising a decrease in IO processing time, determine to dynamically adjust the ideal thread quantity based on the detected change in processing latency, and determine a new revised ideal thread quantity and deactivating another thread in the thread pool based on the determined new revised ideal thread quantity.

Although not expressly shown in the flow diagram 400, the systems also track the timing associated with the foregoing values (e.g., timing for assigning an IO request to a thread, timing to issue an IO request to storage, timing from issuing a thread to storage until it is complete). Each of these timings can be included in the IO processing time referenced previously.

In some instances, the systems also track or otherwise detect changes in processing latency, which comprises an increase in an average IO duration time. In particular, the systems can track any increase or decrease in the time it takes from the thread issuing an IO request to storage until a notification of the IO being completed is received from the storage.

In response to such a change in processing latency, the systems will dynamically determine to adjust the ideal thread quantity and activate or deactivate one or more new threads in the thread pool based on the determined new ideal thread quantity.

By determining and utilizing the ideal thread quantity in this manner to manage the activation or deactivation of threads, the systems are able to dynamically respond to correspondingly dynamic variables in computing environments and to thereby mitigate inefficiencies and costs associated with activating too many or too few threads during runtime processing.

Once the threads are activated or deactivated, the newly received IO requests can be assigned to active threads having the lowest quantity of currently assigned and uncompleted IO requests, for example.

Many of the foregoing examples are specifically directed to scenarios in which IO requests correspond to requests sent from a virtual machine to a hypervisor storage stack or from a client machine to a storage file server storage. However, it will be appreciated, that the scope of the disclosure applies more broadly to other scenarios in which any type of request is being processed and spends time awaiting issuance and routing to a device or external system. By way of further example, the disclosed methods would also apply to instances in which a system that has front-end and back-end servers configured for processing web requests. In such instances, the front-end server performs some preliminary CPU processing before forwarding the web request(s) to the back-end server for further processing to satisfy the request. The front-end server may implement the disclosed methods for assigning the requests to different threads for processing by the back-end server(s).

Additionally, with regard to all of the foregoing, it will be appreciated that the disclosed embodiments may include, be practiced by, or implemented by a computer system, such as computer system 110 of FIG. 1, which is configured with one or more hardware processors and computer storage that stores computer-executable instructions that, when executed by one or more processors, cause various functions to be performed, such as the acts recited above.

Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, embodiments of the disclosure can comprise at least two distinctly different kinds of computer-readable media: physical computer-readable storage media and transmission computer-readable media.

Physical computer-readable storage media includes random access memory (RAM), read only memory (ROM), electrically erasable programmable ROM (EEPROM), compact disk ROM (CD-ROM) or other optical disk storage (such as compact disks (CDs), digital video disks (DVDs), etc.), magnetic disk storage or other magnetic storage devices, or any other hardware storage devices which can be used to store desired program code in the form of computer-executable instructions or data structures and which can be accessed by a general purpose or special purpose computer.

A "network" (e.g., network 130) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a network interface card (NIC)), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for dynamically adjusting a quantity of active threads in a thread pool configured for processing input/output (IO) requests, the method comprising:

determining a quantity of IO requests to be processed based on a combination of (i) a quantity of IO requests received but not yet assigned to a set of threads in the thread pool and (ii) a quantity of IO requests currently in process, having been previously assigned to the set of threads but not yet completed;

determining a thread pipeline value associated with a quantity of IO requests required to fill a predetermined average thread pipeline capacity by computing a ratio of (i) an IO duration time based on an average time from when an IO request is issued to a storage device until an IO completion notice is received from the storage device and (ii) an IO processing time based on an average time from when the IO request is assigned to a thread until it is issued to the storage device;

determining an ideal thread quantity of active threads for the set of threads in the thread pool by computing a ratio of (i) the quantity of IO requests to be processed and (ii) the thread pipeline value;

determining that a quantity of active threads in the set of threads is less than the ideal thread quantity; and activating a new thread in the thread pool.

2. The method of claim 1, wherein the method further comprises:
detecting a change in processing latency comprising an increase in the IO duration time;
determining a new ideal thread quantity in response to the change in processing latency; and
activating an additional thread in the thread pool based on the new ideal thread quantity.

3. The method of claim 1, wherein the determining the IO duration time is based on a tracked average of time from when a plurality of previous IO requests was issued to the storage device until a corresponding IO completion notice is received from the storage device for each of the plurality of previous IO requests.

4. The method of claim 1, wherein the IO duration time is determined by estimating the IO duration time based on anticipated processing associated with detected types of IO requests being received.

5. The method of claim 1, wherein the IO duration time is further based on a user input specifying the IO duration time.

6. The method of claim 1, wherein the activating the new thread comprises changing a state of a previously existing thread in the thread pool from an idle state to an active state.

7. The method of claim 1, wherein the activating the new thread comprises adding a new thread to the thread pool, thereby increasing a quantity of threads in the thread pool.

8. The method of claim 1, wherein the IO request is a request from a virtual machine (VM) to a hypervisor storage stack.

9. The method of claim 1, wherein the IO request is a request from a remote machine to a file server storage.

10. The method of claim 1, further comprising assigning a newly received IO request to an active thread in the thread pool.

11. The method of claim 10, wherein the newly received IO request is assigned to the active thread which has a lowest quantity of currently assigned and uncompleted IO requests.

12. The method of claim 1, further comprising changing a state of a particular thread in the thread pool from an active state to an inactive state in response to determining the particular thread does not have any currently assigned and uncompleted IO requests.

13. The method of claim 1, further comprising removing a particular thread from the thread pool in response to determining the particular thread does not have any currently assigned and uncompleted IO requests.

14. A computer system comprising:
a processing system; and
a storage device having stored computer-executable instructions which are executable by the processing system for causing the computer system to:
detect a quantity of input/output (IO) requests received but not yet assigned to a set of threads in a thread pool;
determine a quantity of IO requests currently in process, having been previously assigned to the set of threads, but not yet completed;
compute a quantity of IO requests to be processed based on a combination of (i) the detected quantity of IO requests received but not yet assigned and (ii) the determined quantity of IO requests currently in process;
determine an IO duration time based on an average time from when an IO request is issued to a storage device until the IO completion is received from the storage device;
determine an IO processing time based on an average time from when an IO request is assigned to a thread until it is issued to a storage device;
compute a thread pipeline value associated with a quantity of IO requests required to fill a predetermined average thread pipeline capacity by determining a ratio of (i) the determined IO duration time and (ii) the IO processing time;
determine an ideal thread quantity of active threads for the set of threads in the thread pool by dividing the quantity of IO requests to be processed by the thread pipeline value;
determining that a quantity of active threads in the set of threads is less than the ideal thread quantity; and
activating a new thread in the thread pool.

15. The computer system of claim 14, wherein the computer-executable instructions are further executable by the processing system for causing the computer system to:
detect a change in processing latency comprising an increase in IO duration time;
determine to dynamically adjust the ideal thread quantity based on the detected change in processing latency; and
determine a new ideal thread quantity and activating another new thread in the thread pool based on the determined new ideal thread quantity.

16. The computer system of claim 14, wherein the IO duration time is an estimated time based on anticipated processing associated with detected types of IO requests being received.

17. The computer system of claim 14, wherein the IO duration time is an average processing time required to complete a predetermined quantity of IO requests that were previously issued to the storage device until corresponding IO completion notices were received from the storage device.

18. A computer system comprising:
a processing system; and
a storage device having stored computer-executable instructions which are executable by the processing system for causing the computer system to:
detect a quantity of input/output (IO) requests received but not yet assigned to a set of threads in a thread pool;

determine a quantity of IO requests currently in process, having been previously assigned to the set of threads, but not yet completed;

compute a quantity of IO requests to be processed based on a combination of (i) the detected quantity of IO requests received but not yet assigned and (ii) the determined quantity of IO requests currently in process;

determine an IO duration time based on an average time from when an IO request is issued to a storage device until the IO completion is received from the storage device;

determine an IO processing time based on an average time from when an IO request is assigned to a thread until it is issued to a storage device;

compute a thread pipeline value associated with a quantity of IO requests required to fill a predetermined average thread pipeline capacity by determining a ratio of (i) the determined IO duration time and (ii) the IO processing time;

determine an ideal thread quantity of active threads for the set of threads in the thread pool by dividing the quantity of IO requests to be processed by the thread pipeline value;

determining that a quantity of active threads in the set of threads is more than the ideal thread quantity; and deactivating an active thread in the thread pool.

19. The computer system of claim 18, wherein the computer-executable instructions are further executable by the processing system for causing the computer system to:

detect a change in processing latency comprising an increase in IO duration time;

determine to dynamically adjust the ideal thread quantity based on the detected change in processing latency; and determine a revised ideal thread quantity and activating a new thread in the thread pool based on the determined revised ideal thread quantity.

20. The computer system of claim 19, wherein the computer-executable instructions are further executable by the processing system for causing the computer system to:

detect a change in processing latency comprising a decrease in IO duration time;

determine to dynamically adjust the ideal thread quantity based on the detected change in processing latency; and determine a new revised ideal thread quantity and deactivating another thread in the thread pool based on the determined new revised ideal thread quantity.

\* \* \* \* \*